L. T. AND D. S. KIMMERLE.
TOWING DOLLY FOR VEHICLES.
APPLICATION FILED FEB. 5, 1919.
1,346,712. Patented July 13, 1920.
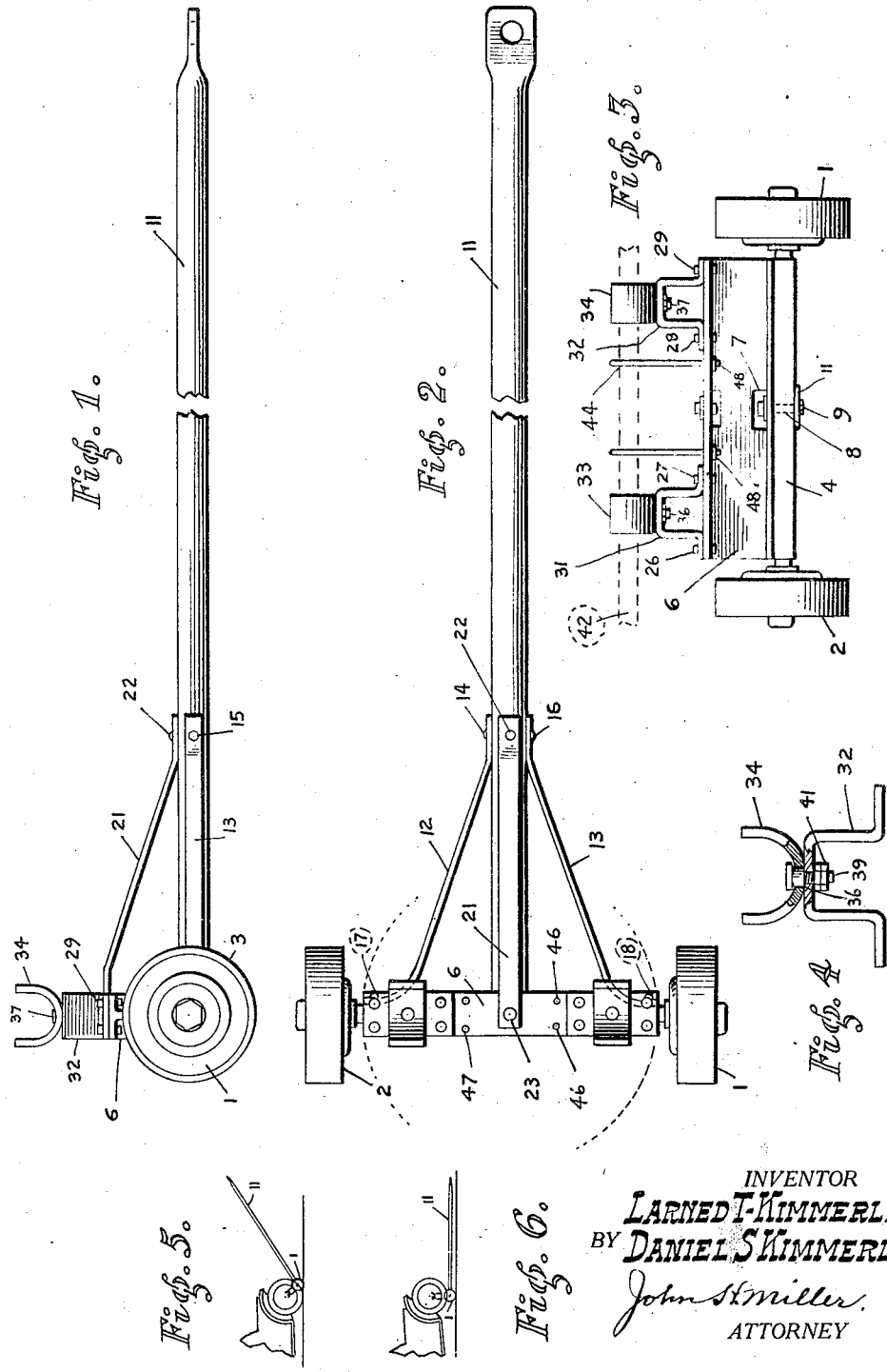
INVENTOR
LARNED T. KIMMERLE
BY DANIEL S KIMMERLE
John H Miller
ATTORNEY

UNITED STATES PATENT OFFICE.

LARNED T. KIMMERLE AND DANIEL S. KIMMERLE, OF SAN FRANCISCO, CALIFORNIA.

TOWING-DOLLY FOR VEHICLES.

1,346,712.   Specification of Letters Patent.   Patented July 13, 1920.

Application filed February 5, 1919.   Serial No. 275,108.

*To all whom it may concern:*

Be it known that we, LARNED T. KIMMERLE and DANIEL S. KIMMERLE, both citizens of the United States, and residents of the city and county of San Francisco, State of California, have made a new and useful Invention—to wit, Towing-Dollies for Vehicles; and we hereby declare the following to be a written description of the same in such full, clear, concise, and exact terms as to enable any person skilled in the art to which it appertains or to which it is most nearly connected to make, construct, and use the same.

In this specification and annexed drawing we illustrate the invention in the form which we consider to be the best, but it is to be understood that we do not limit ourselves to such form because the invention may be embodied in other forms, and it is also to be understood that in and by the claims following the description herein we desire to cover the invention in whatever form it may be embodied.

The present invention is an improved dolly for facilitating the towing of disabled vehicles, and is adapted to complement those members of the running gear of said vehicles which are intact and operative.

The primary object of the invention is to provide a dolly which is adaptable to all the uses which a dolly of ordinary construction may be put and which in addition to such uses may be used in towing a disabled vehicle without the necessity of having a driver in the disabled vehicle.

In garage practice it is frequently necessary to send an attendant with an automobile to tow in a disabled car. Because of the steering knuckle construction conventional in automobile manufacture, it is also necessary to have a driver in the towed machine and the towing operation requires the services of two men. With the novel structure hereinafter described one attendant can easily and quickly engage either the forward or rear axle of a disabled car and elevate it to a point where the wheels will clear the ground and the weight of one end of said disabled car will rest on the bolster of the dolly, which is in pivotal relation to the axle of said dolly and obviously the towed vehicle will follow the leading tractor with the steering gear of the trailed vehicle locked.

In the accompanying one sheet of drawings, wherein like numerals refer to like parts, Figure 1 is a side elevation of an improved dolly.

Fig. 2 is a top plan view of the same.

Fig. 3 is a rear end elevation of the same.

Fig. 4 is a sectional view of a detail.

Fig. 5 is a diagrammatic view showing one adaptation of the dolly.

Fig. 6 is a view of the same in towing position.

Referring to the drawings, the numerals 1 and 2 indicate the wheels of the dolly which are of steel with suitable tires 3 attached. The wheels are journaled in suitable antifriction bearings rotatable on the ends of an axle 4. Supported on the axle 4 and pivotally connected thereto is a bolster 6 made of an I beam. The central vertical web of said I beam is cut away as shown at 7 and the lower flange is bored centrally to receive a bolt 8 which pivotally attaches by means of a nut 9 the bolster 6 to the axle 4.

Interposed between the nether surface of the axle 4 and the nut 9 is one flattened end of a tubular tongue 11 through an eye in which extends the bolt 8.

The tongue 11 is provided with oblique braces 12 and 13 bolted as shown at 14—16— to the said tongue and bolted as shown at 17—18 to the axle 4.

It will be seen from this construction that a lateral movement of the tongue 11 will rotate the axle 4 horizontally independently of the bolster 6 which is pivoted at the central axis of the said axle.

The tongue 11 is also provided with an oblique brace 21 bolted as shown at 22 to the tongue and pivotally connected as shown at 23 to the top flange of the I beam bolster 7.

The purpose of the brace 21 is to strengthen the structure when the dolly is used as a jack as shown in Fig. 5.

Supported by the bolster 6 and bolted as shown at 26, 27, 28 and 29 are two U shaped standards 31 and 32 which form pivotal bases respectively for yokes 33 and 34.

The said yokes are rotatable on pivot pins 36 and 37 as shown in Fig. 4.

The pivot pins extend downwardly through the central axis of the yokes and are provided with a shoulder as shown at 38 resting on the standards 31 and 32 through which extend reduced members 39 threaded to engage nuts 41.

This pivotal connection permits a rowlock movement of the yokes 33, 34; the purpose of which is to engage and support an axle 42 of a towed vehicle shown in dotted lines in Fig. 3.

If it is desired to secure the axle 42 in the yokes 33, 34, U-bolts 44 may be employed in which case the U bolts are inverted and the ends projected through holes 46—47 and secured by nuts 48.

In operation the dolly is wheeled to either end of a vehicle in the position shown in Fig. 5, where the tongue 11 acts as a lever fulcrumed on the wheels 1 and 2 to elevate the vehicle to be towed to the position shown in Fig. 6. At this point the tongue 11 is attached by means of an eye in said tongue to a king bolt or suitable means on the towing vehicle.

Having thus described this invention, what we claim and desire to secure by Letters Patent is:

1. In a dolly for lifting and towing vehicles, two supporting wheels and an axle engaging one of said wheels on each end thereof, an I beam, pivoted centrally to said axle, two yokes, one being swiveled on each end of said I-beam, the axis of the swivels and the pivot lying in the same plane, and a tongue rigid with said axle.

2. In a dolly for lifting and towing disabled vehicles, wheels mounted on the ends of an axle, two yokes mounted pivotally on a truss, said truss pivoted at its center to the center of the axle, all the pivots having their axes in the same plane, and the axle pivot also being in the plane of wheel axis.

3. In a dolly for lifting and towing disabled vehicles wheels mounted on the ends of an axle, two yokes mounted pivotally on a truss, said truss pivoted at its center to the center of the axle, all the pivots having their axes in the same plane, and the axle pivot also being in the plane of wheel axis, and a tongue rigid with said axle.

In testimony whereof, we have hereunto set our hands at San Francisco, California, this 30th day of January, 1919.

LARNED T. KIMMERLE.
DANIEL S. KIMMERLE.

In presence of—
BRADLEY L. BENSON,
A. W. BOYKEN.